United States Patent [19]
Takahashi

[11] Patent Number: 5,127,027
[45] Date of Patent: Jun. 30, 1992

[54] TRAINING SIGNAL DETECTING APPARATUS

[75] Inventor: Futoshi Takahashi, Tokyo, Japan

[73] Assignee: Canon Kabushiki Kaisha, Tokyo, Japan

[21] Appl. No.: 610,118

[22] Filed: Nov. 7, 1990

[30] Foreign Application Priority Data

Nov. 9, 1989 [JP] Japan .................. 1-289899
Nov. 9, 1989 [JP] Japan .................. 1-289900

[51] Int. Cl.$^5$ .................. H03H 7/30; H04L 7/04
[52] U.S. Cl. .................. 375/111; 375/13; 375/116
[58] Field of Search .................. 375/13, 111, 113, 116, 375/121; 371/47.1

[56] References Cited

U.S. PATENT DOCUMENTS

| | | | |
|---|---|---|---|
| 4,577,334 | 3/1986 | Boer et al. | 37.5/97 |
| 4,608,703 | 8/1986 | Kaga et al. | 375/13 |
| 4,796,279 | 1/1989 | Betts et al. | 375/13 |
| 4,847,800 | 7/1989 | Kamerman et al. | 375/13 |
| 4,849,989 | 7/1989 | Kamerman | 375/13 |
| 4,956,851 | 9/1990 | Wolensky et al. | 375/121 |

Primary Examiner—Benedict V. Safourek
Assistant Examiner—Young Tse
Attorney, Agent, or Firm—Fitzpatrick, Cella, Harper & Scinto

[57] ABSTRACT

There is provided a training signal detecting apparatus which detects a repetitive pattern segment included in a reception signal. The apparatus comprises: a receiving unit to receive a training signal; a generator to generate a timing phase error signal according to a sampling timing phase difference between a transmitter and a receiver on the basis of the received training signal; and a detecting unit to generate a detection signal indicative of the detection of a repetitive pattern segment in the training signal when it is determined that a magnitude of the timing phase error signal is larger than a predetermined threshold value. With the apparatus, even if a color noise or a single tone signal is included in a reception signal, a desired repetitive pattern segment can be accurately detected with a small hardware scale of a reception side modem.

12 Claims, 8 Drawing Sheets

TRAINING SIGNAL DETECTING APPARATUS

BACKGROUND OF THE INVENTION

1. Field of the Invention

The present invention relates to a training signal detecting apparatus for detecting a repetitive pattern segment included in a reception signal.

2. Related Background Art

Hitherto, in a facsimile apparatus or the like, the modem according to V.27ter of the CCITT Recommendation and the modem according to V.29 are used.

In the V.27ter modem and the V.29 modem, in order to initialize each signal processing section of the modem on the reception side, the modem on the transmission side transmits a predetermined training signal sequence (turn-on sequence).

For instance, in the V.27ter modem and the V.29 modem, the training signal sequences are determined so as to have a construction as shown in the following tables.

TABLE 1

| | (V.27ter training signal sequence) | | | | | | |
|---|---|---|---|---|---|---|---|
| | Segment 1 | Segment 2 | Segment 3 | Segment 4 | Segment 5 | Total of the segments 1 to 5 | |
| Type of line signal | Non-modulation carrier | No transmission energy | Continuity of reversal of phase by 180° | Pattern for adjustment of 2-phase equalizer of 0–180 | Signal in which continuous "1" was scrambled | Nominal time (total) of turn-on sequence | |
| | | | | | | 4800 bps | 2400 bps |
| Protection for speaker echo | 185 msec 200 msec | 20 msec 25 msec | (a) 14SI (b) 50SI | (a) 58SI (b) 1074SI | 8SI | (a) 265 msec (b) 923 msec | (a) 281 msec (b) 1158 msec |
| No protection | 0 msec | 0 msec | (a) 14SI (b) 50SI | (a) 58SI (b) 1074SI | 8SI | (a) 50 msec (b) 708 msec | (a) 66 msec (b) 943 msec |

SI: Symbol interval (the number of modulating times)
(a): Short sequence (for convergent of the equalizer during connection of the line)
(b): Long sequence (the first sync signal just after the line was set)

TABLE 2

| | (V.29 training signal sequence) | | | | |
|---|---|---|---|---|---|
| | Segment 1 | Segment 2 | Segment 3 | Segment 4 | Total |
| Content of line signal | No transmission signal | Alternating signals of A and B signals | Combination of C and D signals | "1" which was scrambled by $1 + X^{-18} + X^{-23}$ | — |
| The number of symbols | 48 | 128 | 384 | 48 | 608 |
| Time (msec) | 20 | 53 | 160 | 20 | 253 |
| Application | Reception preparation period after segment 2 | AGC adjustment, reception carrier, timing extraction, synchronization, etc. | Initialization of equalizer | Syncronization of scramble and descramble | — |

The reception side modem receives the training signal sequence and initializes an AGC, an automatic equalizer, and the like as a main constructing block of a receiving section.

In Tables 1 and 2, the V.27ter segment 4 and the V.29 segment 3 adjust tap coefficients at the initializing step so that the automatic equalizer which is provided in the reception side modem can realize the inverse characteristics of a communication line.

The initializing operation of the reception side modem is started from start time points of the V.27ter segment 3 and the V.29 segment 2 which are received at earlier timings than that of the segment for adjusting the equalizer.

FIG. 5A shows an absolute phase and an amplitude of a reception signal on the basis of a polar coordinate system. FIG. 5A also shows a construction of a demodulation base band signal in the segment 3 in the V.27ter 8-phase modulation 4800 bps (1600 bauds). In the diagram, Re denotes a real axis of a complex coordinate plane and Im indicates an imaginary axis. As shown by black dots in the diagram, a continuous signal comprising signals whose phases are mutually inverted by 180° is received.

FIG. 5B shows frequency components of a pass band reception signal in the above segment. As shown in the diagram, the pass band reception signal at this time has line spectra at 1000 Hz and 2600 Hz as carrier frequency (1800 Hz)±Nyquist frequency (1600/2 Hz) of the V.27ter.

On the other hand, FIG. 5C shows a construction of a demodulation base band signal in the segment 2 in the 16-value orthogonal amplitude modulation 9600 bps (2400 bauds) of the V.29 by the same form as that of FIG. 5A. When a transmission rate is equal to 9600 bps, alternating patterns at points A and B in the diagram are received.

FIG. 5D shows frequency components of a pass band reception signal in this case. It will be understood that a carrier frequency component (1700 Hz) of the V.29 and line spectra at frequencies of 500 Hz and 2900 Hz corresponding to 1700 Hz±2400/2 Hz are included in the reception signal.

A construction of a conventional training signal detecting apparatus for modem will now be described. FIG. 6 shows a signal detecting apparatus of the segment 3 in the conventional V.27ter 4800 bps training sequence. An analog reception signal which arrived at an analog input terminal 10 is sampled at a sampling frequency of 9600 Hz by an A/D converter 41 and is converted into a discrete value signal.

The discrete value signal is branched to a first pass which is squared by a multiplier 41a and a second pass which is input to band pass filters 42 and 43 having center frequencies of 1 kHz and 2.6 kHz, respectively. In the second pass, outputs of the band pass filters are squared by multipliers 42a and 43a and outputs of the multipliers 42a and 43a are added by an adder 44.

As mentioned above, an output of the multiplier 41a in the first pass indicates a power of the whole frequency components in the pass band of the reception signal, and an output of the adder 44 in the second pass indicates a power of a special frequency component which the reception signal has when it exists in the segment as a detection target.

Therefore, the outputs of both of the passes coincide when the reception signal exists in the segment as a detection target (in this case, V.27ter segment 3) while the reception signal is in the training sequence. Those outputs are different at time points other than such a case. Therefore, it is sufficient to calculate the difference between the outputs of both passes and to determine that a time point when the difference value coincides with 0 is set to a start time point of the detection target segment.

In the conventional example, in order to detect the segment start time point, a signal X which is obtained by multiplying a constant $\alpha$ ($\alpha < 1.0$) to the output of the multiplier 41a is used as an output of the first pass. A difference $(Y-X)$ between the signal X of the first pass and an output signal Y of the second pass is calculated by an adder 45. A signal Z which is obtained by adding and integrating an addition value of the adder 45 by an amount of a few samples by an adder & integrator 46 is input to a discriminating circuit (TH) 7. The reason why the addition and integration are executed by the addition & integrator 46 is to prevent an erroneous detection by caused by noise.

The discriminating circuit 47 generates a discrimination signal 48 indicative of the detection of the segment when $Z > 0$ and the non-detection of the segment when $Z < 0$. Due to this, an adjusting operation start time point of the reception side modem is determined by the discrimination signal 48.

In the above conventional example, since the segment is detected by the polarity of the difference between the power of a special frequency component and the power of the whole frequency components, the target segment can be detected in the case where an additive white noise whose power is at a uniform level for the whole frequency range is associated in the reception signal.

However, there is a drawback such that an erroneous detection of the segment easily occurs in the case where a color noise in which a peak value of the power exists near the special frequency component is associated in the reception signal or where a signal tone signal near the special frequency component is input.

On the other hand, in the above conventional example, since a segment detecting apparatus must be provided independently of and separately from the other signal processing sections of the reception side modem, there is also a problem such that a scale of the hardware of the reception side modem increases.

SUMMARY OF THE INVENTION

It is an object of the invention to improve a training signal detecting apparatus.

Another object of the invention is to prevent an erroneous operation of a training signal detecting apparatus.

Still another object of the invention is to provide a training signal detecting apparatus which can take a proper countermeasure for the input of a color noise and a single tone signal.

Another object of the invention is to accomplish detection of a hardware scale of a modem apparatus.

Further another object of the invention is to provide a modem apparatus which can execute the detection of a start timing for a training process and the synchronization matching between a reception signal and a demodulating process by using a common circuit.

The above and other objects and features of the present invention will become apparent from the following detailed description and the appended claims with reference to the accompanying drawings.

DETAILED DESCRIPTION OF THE PREFERRED EMBODIMENTS

First Embodiment

In the embodiment, a sampling timing phase difference between a transmitter and a receiver is produced from a demodulation base band signal of a reception signal and is compared with a predetermined threshold value. A detection signal indicative of the detection of a desired repetitive pattern segment is output in the case where a period of time when an absolute value of the timing phase difference exceeds the threshold value continues longer than a predetermined period of time.

The repetitive pattern segment to be detected includes a larger number of baud timings as compared with an equalizer adjusting pattern of the subsequent segments, user data, and the like. The duration of the period of time when the absolute value of the timing phase difference exceeds the predetermined threshold value, that is, an extraction amount of the baud timing component is largest in the repetitive pattern segment in the whole period of the turn-on sequence. In the embodiment, a desired repetitive pattern segment is detected on the basis of the extraction amount.

The first embodiment of the invention will now be described in detail hereinbelow with reference to the drawings.

Figure 1:
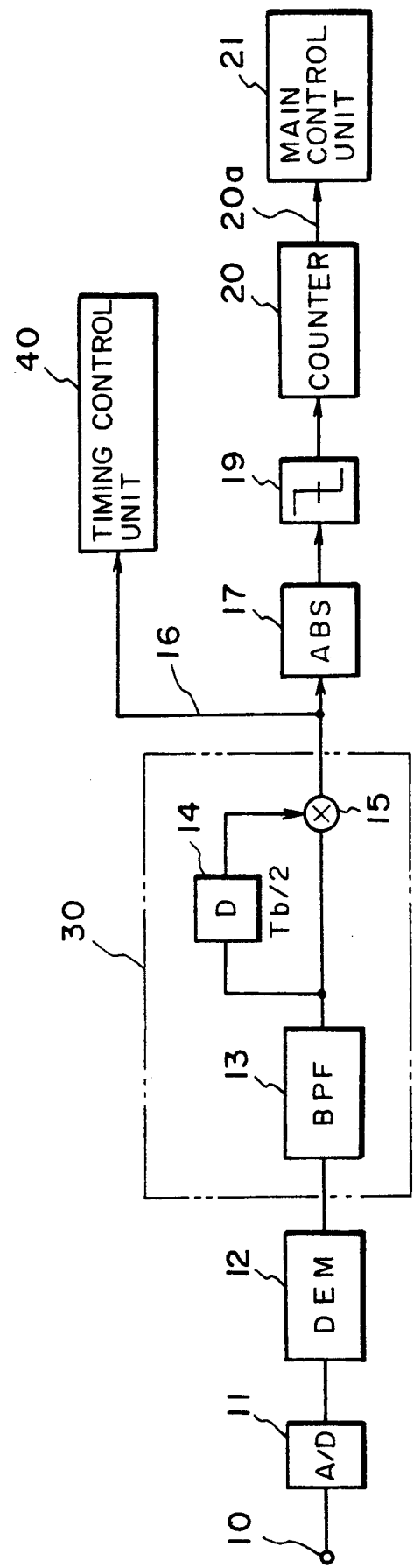
FIG. 1 is a circuit diagram of a first embodiment of the invention.

FIG. 1 is a block diagram showing a construction of a training signal detecting apparatus which embodies the invention. The circuit shown in the diagram is used in a reception side modem or the like of a facsimile apparatus and detects a start timing of the V.27ter segment 3 or V.29 segment 2 corresponding to the training start time point of the reception side modem.

In FIG. 1, reference numeral 10 denotes an input terminal; 11 indicates an A/D converter; 12 a demodulating apparatus (DEM) for demodulating a pass band reception signal and converting into a base band signal; and 13 a narrow band pass filter (BPF) having a center frequency of fb/2 (Hz) in which a baud rate frequency assumes fb (Hz). The BPF 13 filters a demodulation base band signal.

The signal after completion of the filtering is delayed by a delay circuit (D) 14 for delaying the signal by a time of Tb/2 in which a baud rate period assumes Tb (=1/fb). The present sampling value and the sampling value which was delayed by a time of Tb/2 are multiplexed by a multiplier 15.

A circuit 30 surrounded by a broken line in the diagram functions as a timing extracting unit of the reception side modem and is commonly used together with a part of a timing extraction & control unit to execute various demodulating processes synchronously with the reception signal.

A timing phase error signal 16 which is extracted from the timing extracting unit 30 has an amplitude value which is proportional to $\sin(\Delta\phi)$ in which a timing phase difference assumes $\Delta\phi$ (rad).

The signal 16 is input to a full-wave rectifier (ABS) 17 at the post stage and to a timing control unit 40 of the modem and is used for various kinds of controls.

The full-wave rectifier 17 obtains an absolute value of an input signal. Reference numeral 19 denotes a comparator having a predetermined threshold value. The comparator 19 compares the magnitudes of the threshold value and $|\sin(\Delta\phi)|$. The comparator 19 outputs a count-up signal for a sampling value in which the value of $|\sin(\Delta\phi)|$ is equal to or larger than the threshold value and also outputs a counter reset signal for a sampling value in which such an absolute value is smaller than the threshold value.

A counter 20 executes a counting-up operation or a resetting operation in accordance with a control signal from the comparator and outputs a segment detection signal 20a to a main control unit 21 of the modem at the post stage, thereby allowing the training process to be started when the sampling values of the number which is equal to or larger than a predetermined value continue as the values which are equal to or larger than the threshold value, that is, in the case where a period of time when the absolute value of the timing phase error signal exceeds the threshold value of the comparator 19 continues longer than a predetermined time. A predetermined number of sampling values to be counted by the counter 20 is set to about 20 in the case of the V.27ter and to about 40 in the case of the V.29.

Figure 2A:
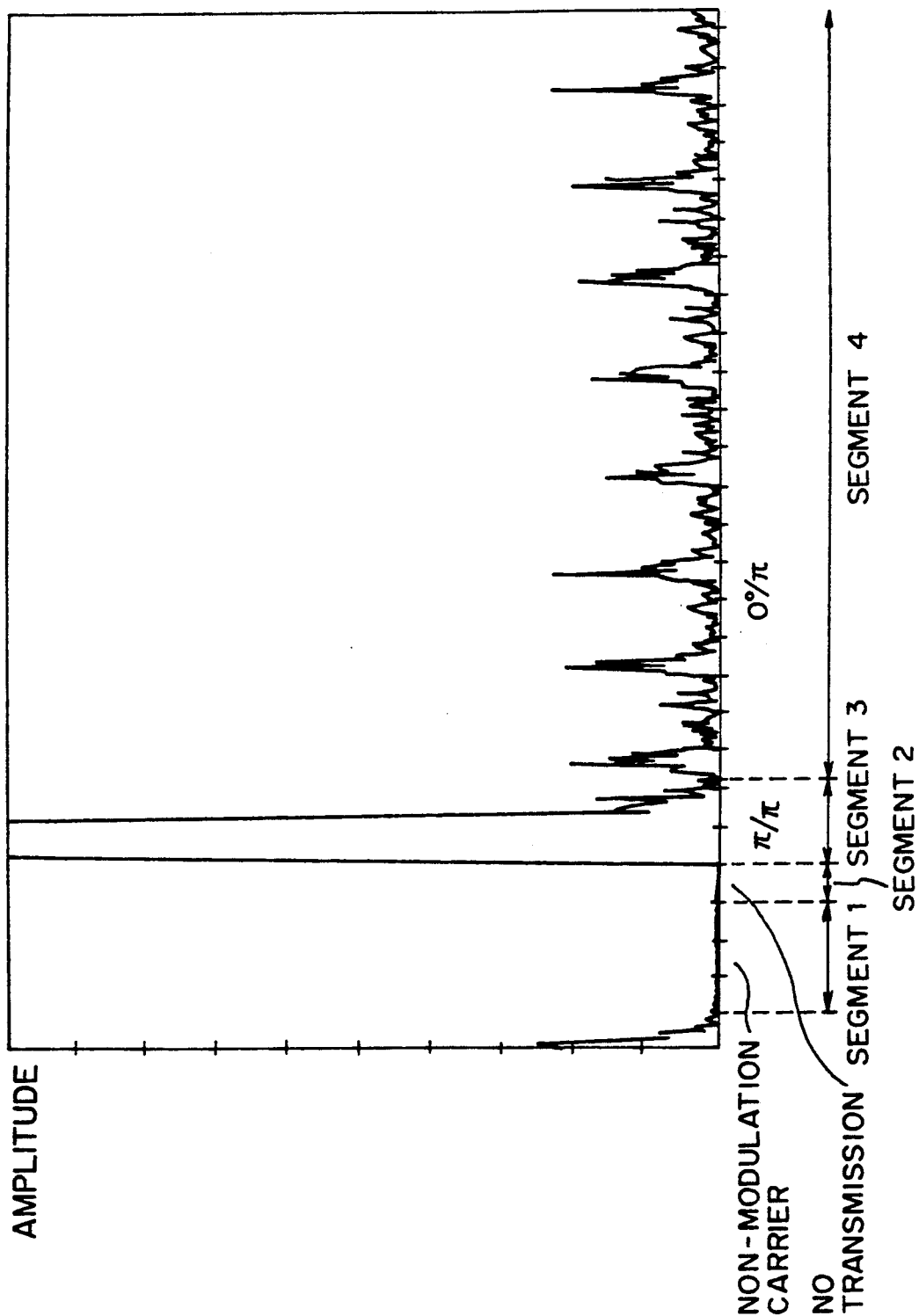
FIGS. 2A and 2B are output signal waveform diagrams of the first embodiment of the invention.
Figure 2B:
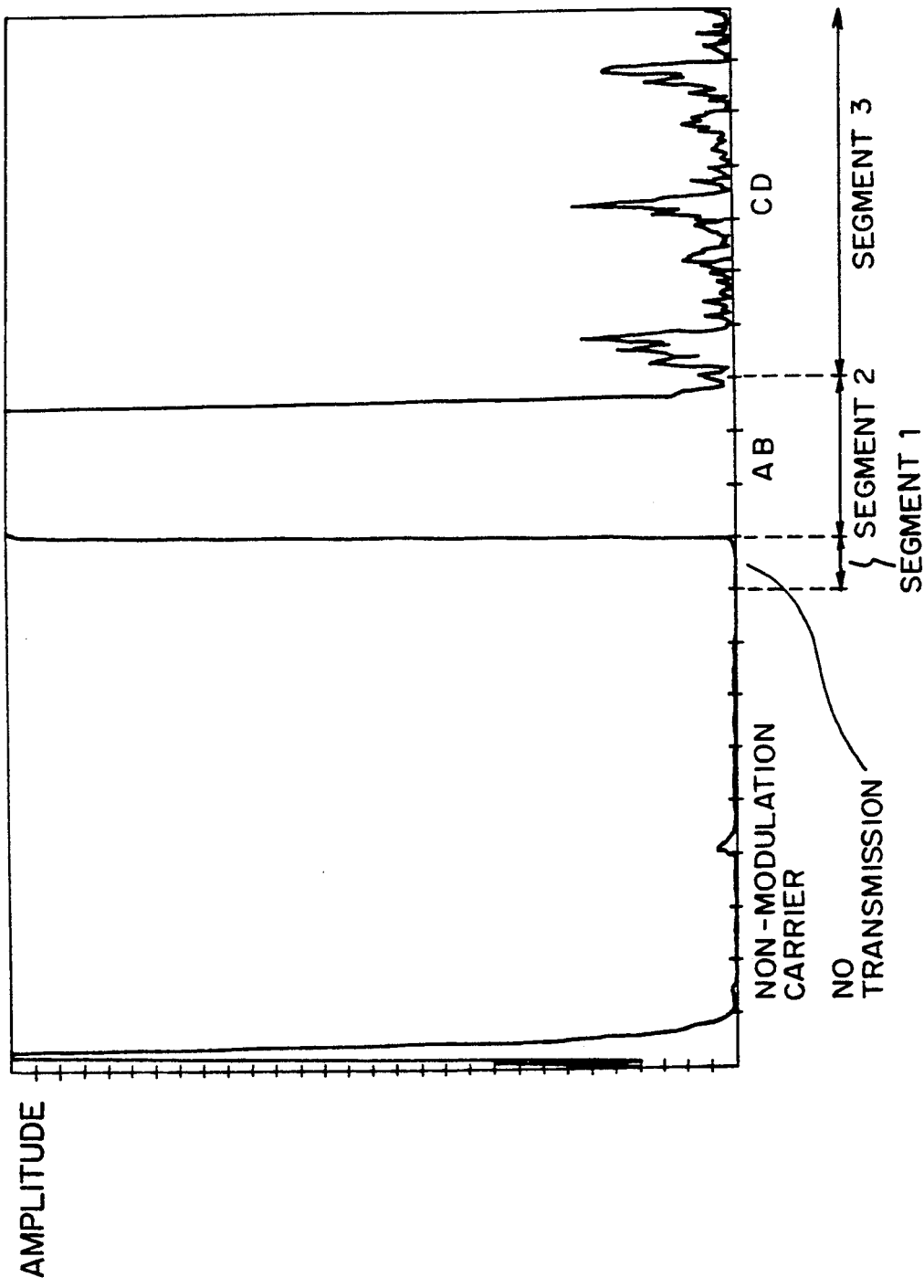

FIGS. 2A and 2B show the results of the simulation by a computer according to the embodiment. FIG. 2A shows a signal corresponding to $|\sin(\Delta\phi)|$ which was extracted from the V.27ter 2400 bps training sequence. FIG. 2B shows a signal corresponding to $|\sin(\Delta\phi)|$ which was extracted from the V.29 9600 bps training sequence. As will be obviously understood from FIGS. 2A and 2B, there is a clear difference between the numbers of samples in which $|\sin(\Delta\phi)|$ exceeds the threshold value in the case of the repetitive pattern segment to be detected and in the case of the reception of another data pattern. Due to this, the repetitive pattern segment can be certainly captured.

It is sufficient to properly set the threshold value to be given to the comparator 19 with reference to FIGS. 2A and 2B.

The segment 3 of V.27ter/bis to be detected as a training start timing of the modem is constructed by the alternating signals whose phases are mutually inverted by 180°. The V.29 segment 2 is constructed by the repetitive patterns of the A and B signals. Therefore, the segments 3 and 2 include a larger number of baud timings as compared with the equalizer adjusting pattern, user's data, or the like of the subsequent segments.

Therefore, the duration of the period of time when the adsolute value of the timing phase error signal 16 which is obtained by the timing extracting unit 30 in FIG. 1 exceeds the threshold value of the comparator 19 is longest in the repetitive pattern segment in the whole period of the turn-on sequence. Such a duration of the period of time is relatively small in the other periods. Therefore, in the conventional construction, there is an advantage such that the segment can be detected at a high accuracy even in the case where a color noise or a special single tone signal such as to cause an erroneous detection is included.

Since the same unit as the timing extracting and control unit of the reception side modem can be commonly used as a timing extracting unit 30 as a main section of the construction of the invention, the hardware scale can be reduced as compared with the conventional construction which needs independent hardware.

In the above embodiment, the timing extracting unit 30 has been constructed by the narrow band pass filter and the delay circuit. However, another different circuit construction which can form a phase error signal can be also used.

Second Embodiment

According to the second embodiment, a plurality of timing phase error signals having amplitude values which are proportional to a sampling timing phase difference between the transmitter and the receiver and also having phases which are mutually orthogonal are produced from a demodulation base band signal of a reception signal and the absolute values of a plurality of timing phase error signals are added. In the case where a period of time when the result of the addition exceeds a predetermined threshold value continues longer than a predetermined time, a detection signal indicative of the detection of a desired repetitive pattern segment is output.

A duration of the period of time when the sum of the absolute values of a plurality of timing phase error signals which are output from the timing extracting unit exceeds the predetermined threshold value, that is, an extraction amount of the baud timing component is largest in the repetitive pattern segment in the whole period of time of the turn-on sequence. In the embodiment, a desired repetitive pattern segment is detected on the basis of the extraction amount.

The second embodiment of the invention will now be described in detail hereinbelow with reference to the drawings.

Figure 3:
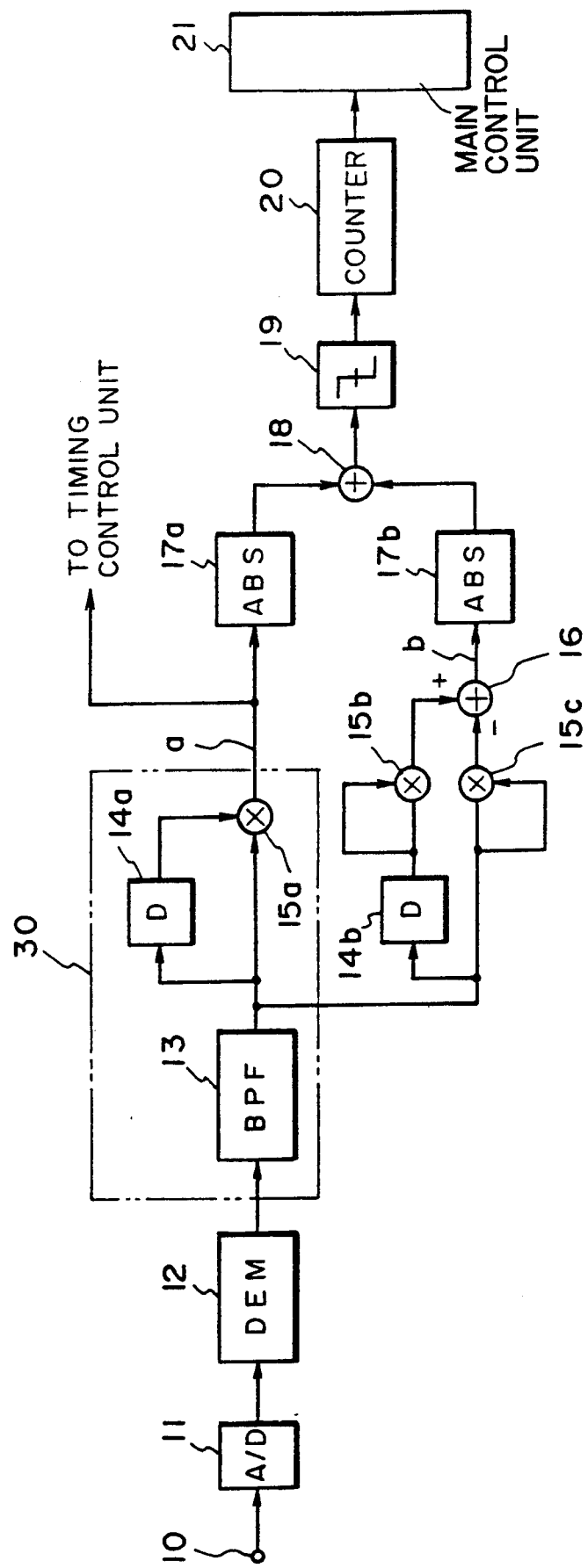
FIG. 3 is a circuit diagram of a second embodiment of the invention.

FIG. 3 is a block diagram showing a construction of a training signal detecting apparatus according to the invention. The circuit shown in the diagram is used for a reception side modem of a facsimile apparatus or the like. A start timing for the V.27ter segment 3 or the V.29 segment 2 corresponding to the training start time point of the reception side modem is detected.

In FIG. 3, reference numeral 10 denotes the input terminal; 11 the A/D converter; 12 the demodulating apparatus (DEM) for demodulating the pass band reception signal and converting into the base band signal; and 13 the narrow band pass filter (BPF) having a center frequency of fb/2 (Hz) in which a baud rate frequency assumes fb (Hz). The BPF 13 filters the demodulated base band signal.

The signal after completion of the filtering operation is delayed by a delay circuit (D) 14a for delaying the signal by a time of Tb/2 in which a baud rate period assumes Tb (=1/fb). The present sampling value and the sampling value after it was delayed by a time of Tb/2 are multiplied by a multiplier 15a. A resultant timing phase error signal a has an amplitude value which is proportional to sin (Δφ) in which a timing phase error assumes Δφ (rad).

On the other hand, the signal which was filtered is also delayed by a delay circuit (D) 14b by a time of Tb/2. After that, the delayed signal is squared by a multiplier 15b. A difference between the squared signal from the multiplier 15b and the signal which was likewise squared by a multiplier 15c is calculated by the adder 16. A resultant timing phase error signal b has an amplitude value which is proportional to cos(Δφ) for the timing phase difference Δφ. That is, the timing extraction signal a is $$a \propto \sin\left(\frac{\Delta fb}{2} t\right) \cdot \cos\left(\frac{\Delta fb}{2} t\right) \propto \sin(\Delta fb \cdot t) = \sin(\Delta \phi)$$

On the other band, the timing extraction signal b is $$b \propto \cos^2\left(\frac{\Delta fb}{2} t\right) - \sin^2\left(\frac{\Delta fb}{2} t\right) \propto \cos(\Delta fb \cdot t) = \cos(\Delta \phi)$$

It will be understood that the timing extraction signals a and b construct a pair of timing extraction signals which have amplitude values proportional to the timing phase difference and which are mutually orthogonal. After absolute values of the signals a and b were obtained by full-wave rectifiers (ABS) 17a and 17b, they are added by an adder 18 and the result of the addition is given to the comparator 19.

As mentioned above, the signal whose magnitude is compared with a threshold value which has been preset in the comparator 19 is the signal corresponding to $|\sin(\Delta\phi)| + |\cos(\Delta\phi)|$. Therefore, even if the timing phase difference Δφ has an arbitrary value, such a signal can be compared with a fixed threshold value.

The timing extracting circuit 30 surrounded by a broken line in the diagram functions as a timing extracting unit of the reception side modem and executes various kinds of demodulating processes synchronously with the reception signal, so that it is commonly used as a part of the timing extracting and control unit.

The comparator 19 outputs a count-up signal for the sampling value in which $|\sin(\Delta\phi)| + \cos(\Delta\phi)|$ equal to or larger than the threshold value. The comparator 19 outputs a counter reset signal for the sampling value in which such an absolute value is smaller than the threshold value.

The counter 20 executes the counting-up operation or the resetting operation in accordance with the control signal from the comparator. When the sampling values of the number which is equal to or larger than a predetermined value continue as the values which are equal to or larger than the threshold value, that is, in the case where a period of time when the sum of the absolute values of the timing phase error signals a and b exceeds the threshold value of the comparator 19 continues longer than a predetermined time, the counter 20 outputs a segment detection signal to the main control unit 21 of the modem at the post stage, thereby allowing the equalizer adjusting process to be started.

Figure 4A:
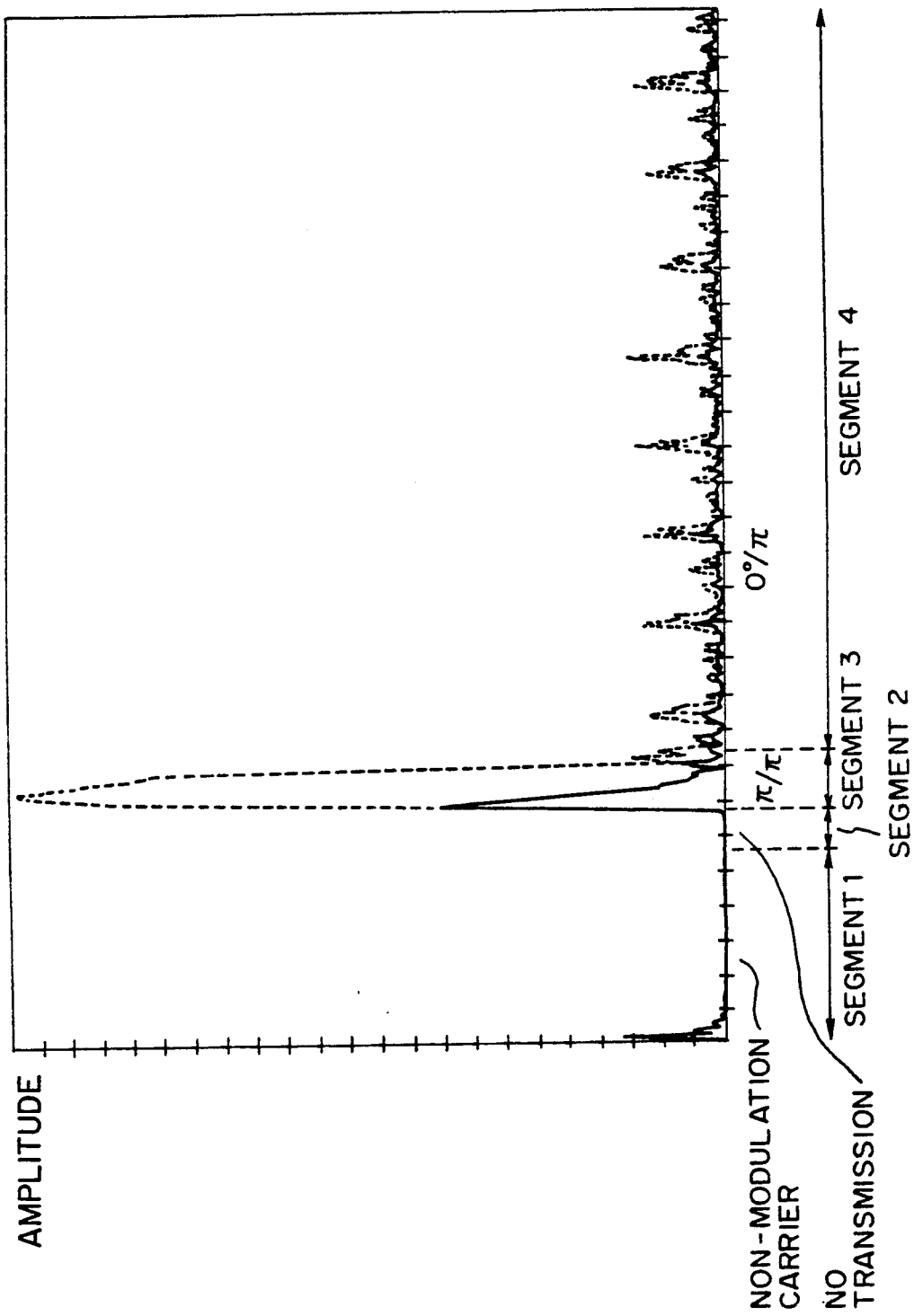
FIGS. 4A and 4B are output signal waveform diagrams of the second embodiment of the invention.
Figure 4B:
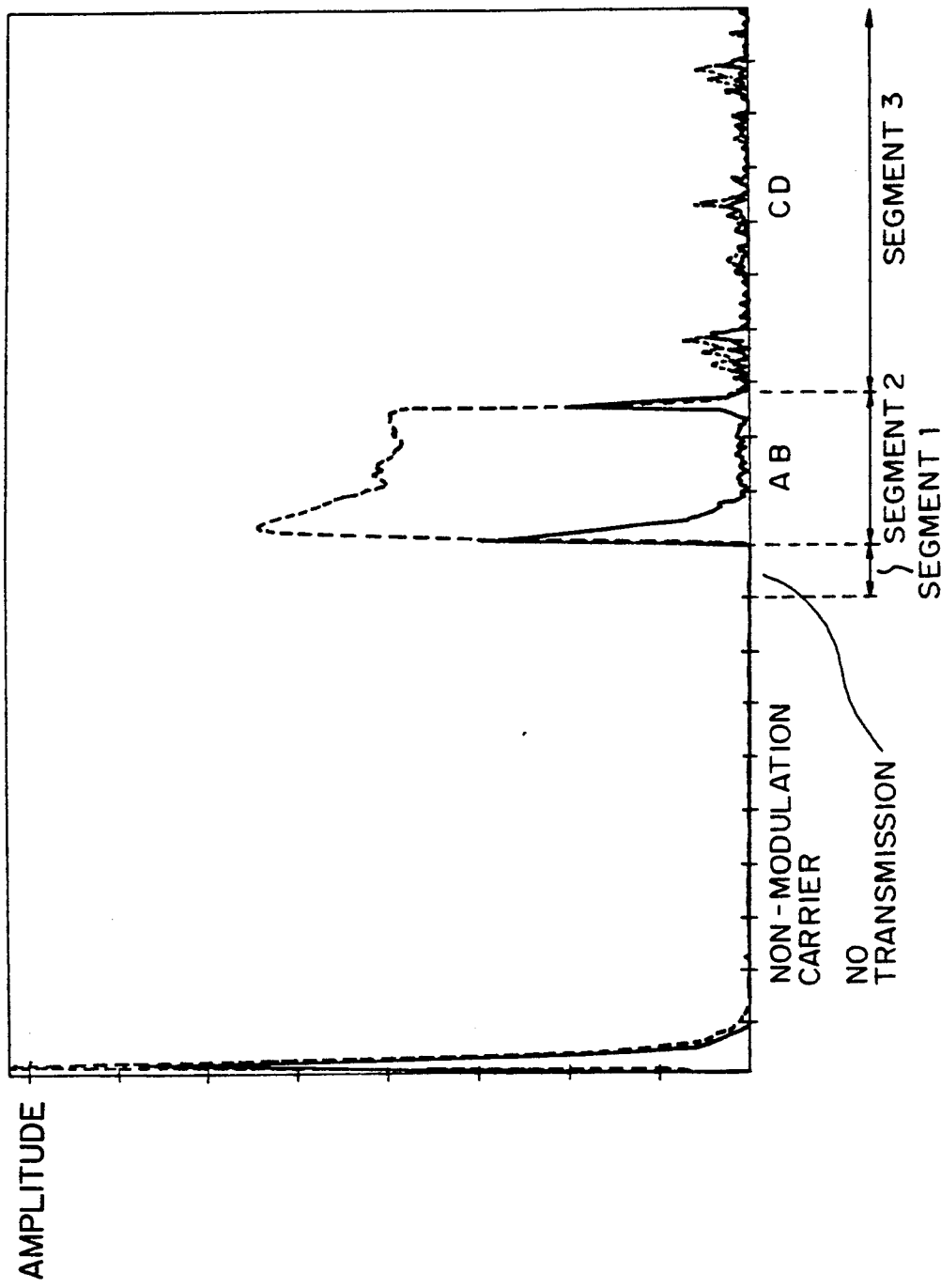
Figure 5A:
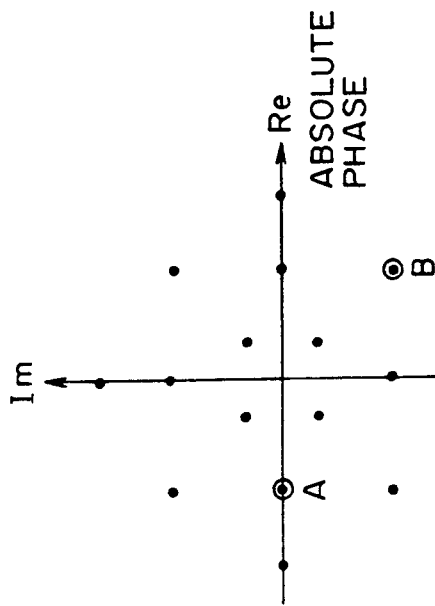
FIGS. 5A to 5D are diagrams showing the phases and frequencies of training signals.
Figure 5B:
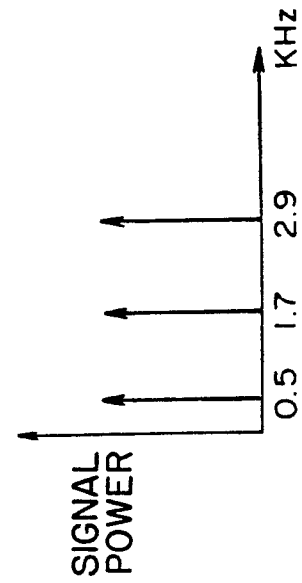
Figure 5C:
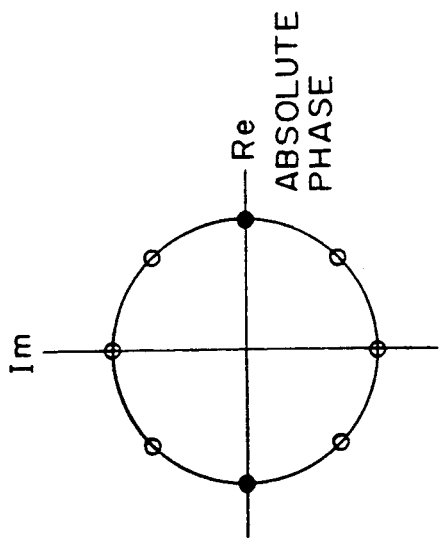
Figure 5D:
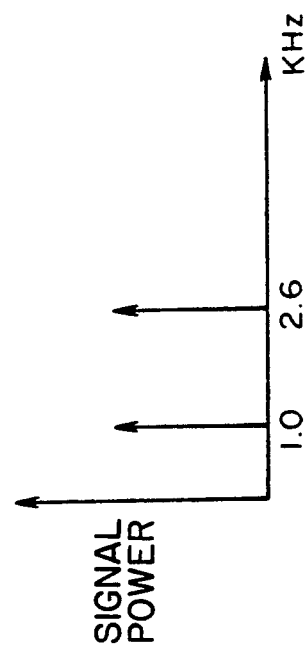
Figure 6:
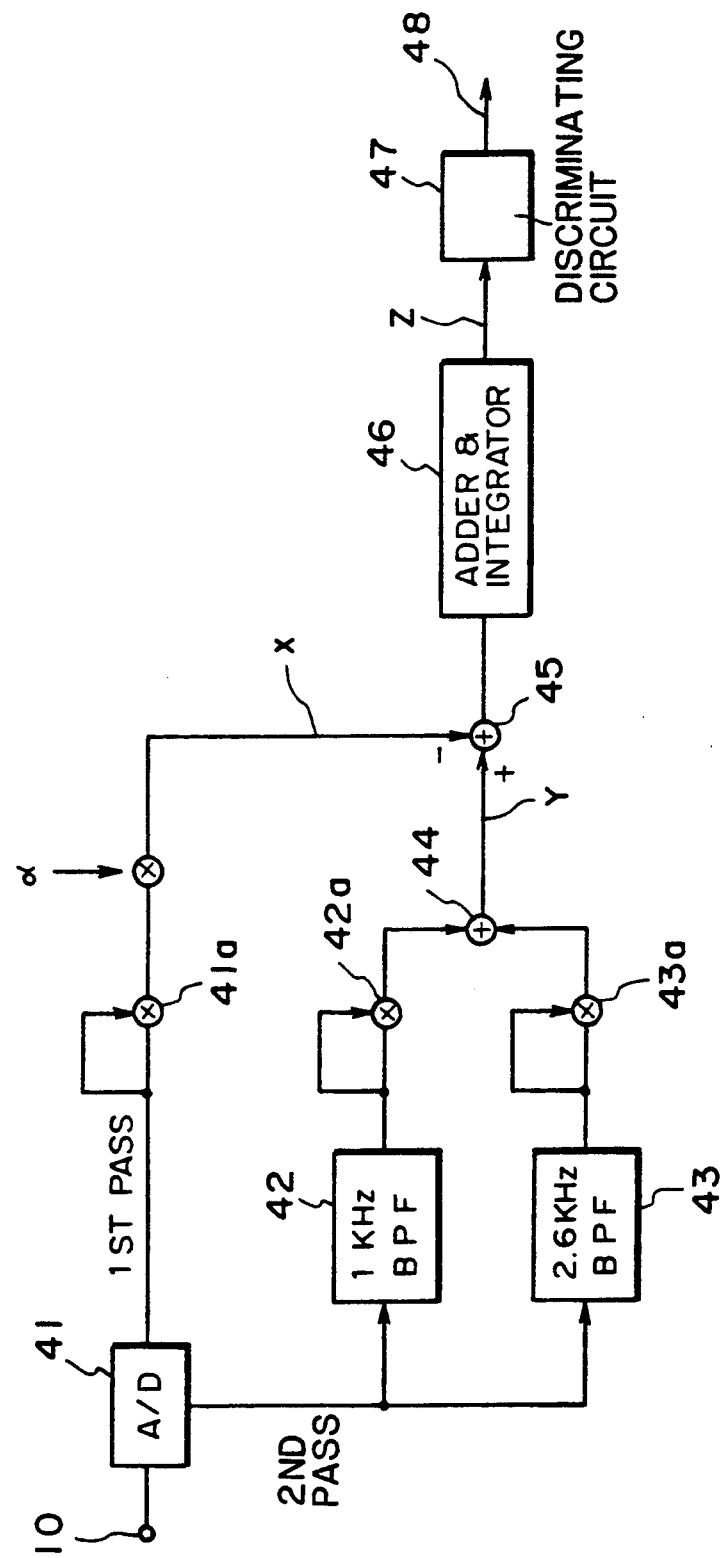
FIG. 6 is a circuit diagram of a conventional example.

FIGS. 4A and 4B show the results of the simulation by the computer according to the embodiment. FIG. 4A shows the signal corresponding to $|\sin(\Delta\phi)|$ (solid line portion: corresponding to the signal a in FIG. 3) which was extracted from the V.27ter 4800 bps training sequence. FIG. 4B shows the signal corresponding to $|\cos(\Delta\phi)|$ (broken line portion: corresponding to the signal b in FIG. 3) which was extracted from the V.29 9600 bps training sequence.

As will be obviously understood from FIGS. 4A and 4B, even in the case where an arbitrary timing phase difference Δφ exists, there is a clear difference between the numbers of samples in which $|\sin(\Delta\phi)| + |\cos(\Delta\phi)|$ exceeds the threshold value in the case of the repetitive pattern segment to be detected and in the case of the reception of another data pattern. Due to this, the repetitive pattern segment can be certainly captured.

The V.27ter/bis segment 3 to be detected as a training start timing of the modem is constructed by the alternating signals whose phases are mutually inverted by 190°. The V.29 segment 2 is constructed by the repetitive patterns of the signals A and B. Therefore, the segments 3 and 2 include a larger number of baud timings as compared with the equalizer adjusting pattern, user's data, or the like of the subsequent segments.

A duration of a period of time when the sum of the absolute values of the timing phase error signals a and b having the orthogonal phases which are derived from the timing extracting unit 30 in FIG. 3 exceeds the threshold value of the comparator 19 is largest in the repetitive pattern segment in the whole period of time of the turn-on sequence. Such a duration of the period of time is relatively small in other periods. Therefore, there is an advantage such that the segment can be detected at a high accuracy even in the case where a color noise or a special single tone signal such as to cause an erroneous detection in the conventional construction is included.

On the other hand, according to the embodiment, the sum of the absolute value of two timing phase error signals having orthogonal phases is compared with a predetermined value and a desired signal segment is detected on the basis of a continuation period of time of a certain result of the comparison. Therefore, even in the case where a sampling clock phase between the modems on the transmission and reception sides is accompanied with an arbitrary initial timing phase difference or where a transmission deterioration factor (timing frequency difference) such that the timing phase difference fluctuates with the elapse of time exists, a discrimination regarding the detection or non-detection of a target segment can be stably performed by using a fixed value.

Further, since the same unit as the timing extracting and control unit of the reception side modem can be commonly used as a timing extracting unit 20 as a main section of the construction of the embodiment, the hardware scale can be reduced as compared with the conventional construction which needs an independent hardware.

In the above embodiment, the timing extracting unit has been constructed by the narrow band pass filter and the delay circuit. However, another different circuit construction which can form a phase error signal can be also used.

I claim:

1. A training signal detecting apparatus comprising:
    receiving means for receiving a training signal;
    multiplying means for multiplying a first training signal and a second training signal together, phases of the first and second training signals being shifted from each other by one half of a baud rate period;
    control means for controlling a reception timing, on the basis of a multiplied output of said multiplying means; and
    detecting means for detecting a repetitive pattern segment in the training signal, on the basis of the multiplied output of said multiplying means.

2. An apparatus according to claim 1, wherein said receiving means comprises delay means for delaying the received training signal by a time of one half of the baud rate period.

3. An apparatus according to claim 1, wherein said receiving means comprises:
    converting means for converting a pass band reception signal into a base band signal; and
    filter means for allowing a signal of frequencies near one half of a baud rate frequency in the base band signal to pass.

4. An apparatus according to claim 1, where said detecting means detects the repetitive pattern segment when a period of time during which a magnitude of the multiplied output of said multiplying means is larger than a predetermined threshold value continues for a predetermined length of time.

5. An apparatus according to claim 1, wherein said detecting means detects the repetitive pattern segment when the multiplied output of said multiplied means is larger than a predetermined threshold value.

6. A training signal detecting apparatus comprising:
    receiving means for receiving a training signal;
    first multiplying means for multiplying a first training signal and a second training signal together, phases of the first and second training signals being shifted from each other by one half of a baud rate period;
    second multiplying means for squaring the first training signal;
    subtracting means for obtaining a difference between a first multiplied output of said first multiplying means and a second multiplied output of said second multiplying means;
    control means for controlling a reception timing, on the basis of the multiplied output of said first multiplying means; and
    detecting means for detecting a repetitive pattern segment in the training signal, on the basis of the difference obtained by said subtracting means.

7. An apparatus according to claim 6, wherein said detecting means detects the repetitive pattern segment when a period of time that a magnitude of the difference obtained by said subtracting means is larger than a predetermined threshold value continues for a predetermined period of time.

8. An apparatus according to claim 6, wherein said subtracting means further comprises:
    third multiplying means for squaring the second training signal;
    second subtracting means for subtracting the multiplied output of said second multiplying means from a multiplied output of said third multiplying means; and
    adding means for adding the multiplied output of said first multiplying means and subtracted output of said second subtracting means.

9. An apparatus according to claim 6, wherein said detecting means detects the repetitive pattern segment when the difference obtained by said subtracting means is larger than a predetermined threshold value.

10. A repetitive pattern recognition method, comprising the steps of:
    receiving a training signal;
    delaying the received training signal by one half of a baud rate period;
    multiplying the training signal which is delayed and a training signal which is not delayed, together;
    controlling reception timing on the basis of a multiplication result obtained in said multiplying step; and
    recognizing a repetitive pattern segment on the basis of the multiplication result.

11. A method according to claim 10, wherein, during said recognizing step, the repetitive pattern segment is recognized when the multiplication result is larger than a predetermined value.

12. A method according to claim 10, wherein during said recognizing step, the repetitive pattern segment is recognized when a period of time during which the multiplication result is larger than a predetermined value continues for a predetermined length of time.

* * * * *

UNITED STATES PATENT AND TRADEMARK OFFICE
CERTIFICATE OF CORRECTION

PATENT NO. : 5,127,027
DATED : June 30, 1992
INVENTOR(S) : FUTOSHI TAKAHASHI

It is certified that error appears in the above-identified patent and that said Letters Patent is hereby corrected as shown below:

On the Title page, item,

[56] REFERENCES CITED

U.S. PATENT DOCUMENTS, "4,847,800  7/1989  Kamerman et al."
should read --4,847,880  7/1989  Kamerman et al.--.

COLUMN 3

Line 36, "discriminating circuit (TH) 7." should read
--discriminating circuit (TH) 47.--.
Line 43, "z<0." should read --z≦0.--.

COLUMN 4

Line 9, "Further another" should read --Still another--.

COLUMN 8

Line 64, "an" should be deleted.

Signed and Sealed this

Seventh Day of September, 1993

Attest:

BRUCE LEHMAN

Attesting Officer          Commissioner of Patents and Trademarks